United States Patent
Dobie et al.

(10) Patent No.: US 7,028,416 B1
(45) Date of Patent: Apr. 18, 2006

(54) NOISE ATTENUATING DRYING APPARATUS FOR MOTOR VEHICLES

(76) Inventors: Darryl D Dobie, 2570 Outlook Trail, Broomfield, CO (US) 80020; Cheryl A Dobie, 2570 Outlook Trail, Broomfield, CO (US) 80020

( * ) Notice: Subject to any disclaimer, the term of this patent is extended or adjusted under 35 U.S.C. 154(b) by 0 days.

(21) Appl. No.: 10/828,743

(22) Filed: Apr. 20, 2004

Related U.S. Application Data (60) Provisional application No. 60/464,178, filed on Apr. 21, 2003.

(51) Int. Cl.
*F26B 25/06* (2006.01)

(52) U.S. Cl. ...................................................... 34/666

(58) Field of Classification Search ............... 181/222, 181/286, 290, 293, 149, 155; 34/666
See application file for complete search history.

(56) References Cited

U.S. PATENT DOCUMENTS

| | | | | |
|---|---|---|---|---|
| 2,770,496 A | * | 11/1956 | Wilson | 239/592 |
| 3,918,171 A | * | 11/1975 | Hull | 34/666 |
| 4,919,245 A | * | 4/1990 | Braden | 165/10 |
| 4,947,958 A | * | 8/1990 | Snyder | 181/296 |
| 6,192,604 B1 | * | 2/2001 | Morrison | 34/666 |
| 6,672,424 B1 | * | 1/2004 | Gadefait et al. | 181/225 |
| 6,857,502 B1 | * | 2/2005 | Naito | 181/252 |

* cited by examiner

*Primary Examiner*—Kenneth Rinehart
(74) *Attorney, Agent, or Firm*—Brian D. Smith, P.C.

(57) ABSTRACT

An air duct for a motor vehicle air dryer has an outer shell defining an inner surface. A porous, fluid permeable lining for attenuating noise caused by turbulent air flow through the air duct is positioned on the shell inner surface, and defines an inner surface. The lining is retained in place by a relatively rigid expanded mesh adjacent the inner surface of the lining. The interior lining and mesh is preferably removable from the outer shell, but may be permanently mounted therein.

13 Claims, 13 Drawing Sheets

NOISE ATTENUATING DRYING APPARATUS FOR MOTOR VEHICLES

CROSS REFERENCE TO RELATED APPLICATION

This application is a nonprovisional application claiming the benefit under 35 USC 119(e) of U.S. provisional application Ser. No. 60/464,178, filed on Apr. 21, 2003.

FIELD OF THE INVENTION

The present invention relates to dryers for vehicles and more particularly to air dryers that blow air over a vehicle for drying the same after an automatic car wash.

BACKGROUND OF THE INVENTION

Forced air drying systems for drying motor vehicles washed in an automatic car wash are generally known; however, such units are often noisy and generally do not meet OSHA or other governing noise standards.

SUMMARY OF THE INVENTION

The present invention addresses the aforementioned noise problem associated with conventional automatic car wash dryers by providing an air duct for car wash dryers having a noise attenuating, porous, fluid permeable lining. The lining is held in place or retained against the inner surface of the dryer's outer shell by a relatively rigid mesh which is positioned interior of the lining, i.e. against the inwardly facing or exposed surface of the lining. The lining is preferably a rock wool or an open cell polyurethane foam. If the lining is rock wool, an additional retaining material, preferably an expanded glass fiber cloth mesh material, is provided between the rigid mesh and the exposed surface of the rock wool.

In a preferred embodiment, a cylindrical air duct having an air inlet end and an air outlet end is provided with a removable intermediate sleeve positioned within the duct adjacent the inner surface thereof. The removable intermediate sleeve comprises an inner rigid, expanded mesh cylindrical sleeve and an outer porous sleeve contained and supported on its inner surface by the mesh sleeve. The outer surface of the porous sleeve engages the inner surface of the cylindrical duct. The inner mesh sleeve also has an inlet end and an outlet end corresponding to the inlet and outlet ends of the cylindrical duct. Means for supporting the removable intermediate sleeve in the cylindrical duct are also provided. In addition, an inner longitudinally extending sleeve is positioned coaxially in the intermediate sleeve. The inner sleeve has inner and outer spaced apart wire mesh sleeves defining an annular chamber with an annular porous sleeve retained in the annular chamber. Means are also provided for supporting the inner sleeve on the intermediate sleeve.

BRIEF DESCRIPTION OF THE DRAWINGS

The invention will be more readily understood by reference to the accompanying drawings wherein like reference numerals indicate like elements, and in which.

DETAILED DESCRIPTION OF PREFERRED EMBODIMENTS

Figure 1:
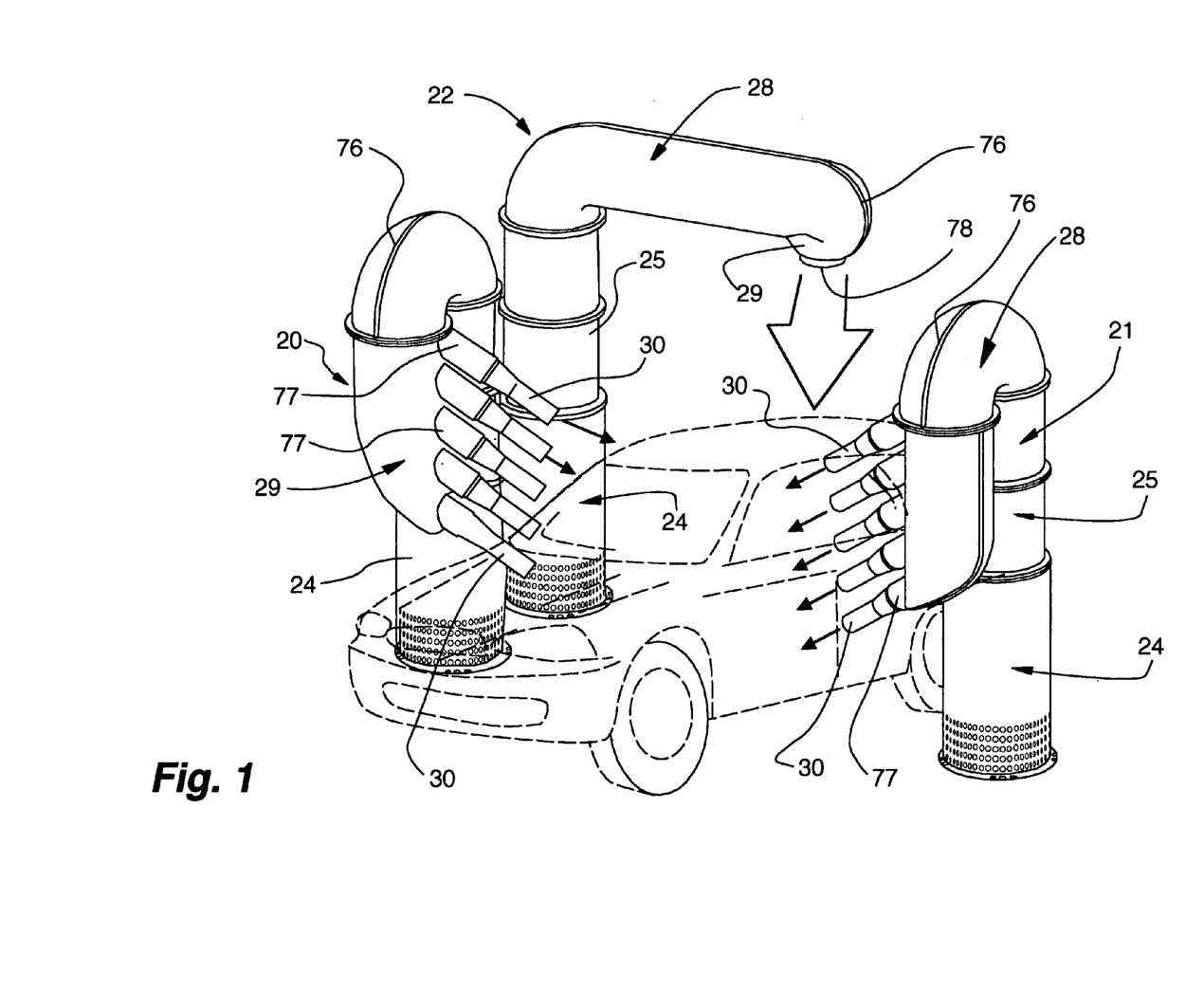
FIG. 1 is a perspective view of an air blowing vehicle drying system embodying the present invention.
Figure 2:
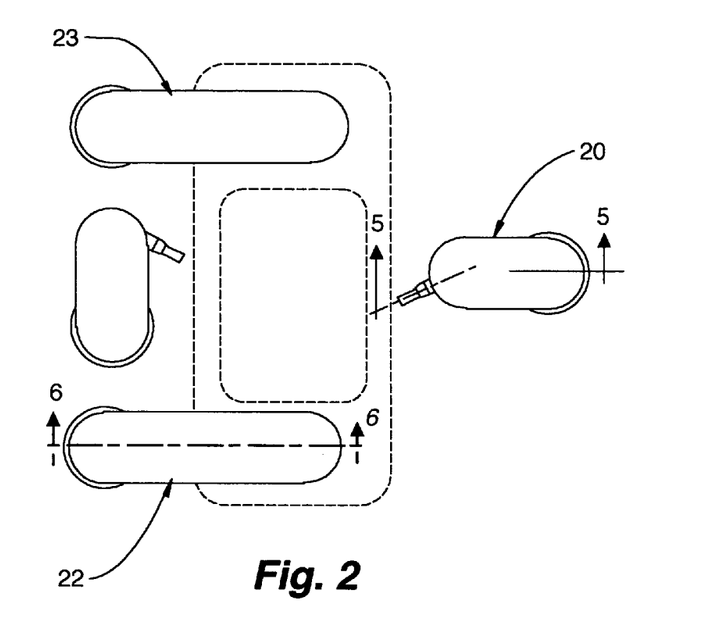
FIG. 2 is a plan view of a vehicle air drying system similar to that shown in FIG. 1 with an added optional vehicle top dryer and the side dryers rearranged.

The present invention is embodied in a noise attenuated or reduced noise air blowing system for drying motor vehicles following washing of the vehicle. The drying system embodying the present invention as shown in FIGS. 1 and 2 is formed in three parts or units, namely two side air blower units 20, 21 for drying the sides of the vehicle and one or two top blower units 22, 23 (blower unit 23 shown in FIG. 2 only) for drying the top of the vehicle. Each unit includes an air inlet or intake section 24; a blower section 25, including one or more fans 26, for drawing air into the unit through the intake section 24; a transition section 28 for receiving air from the blower section 25 and directing it to an outlet or nozzle section 29, including one or more nozzles 30 for blowing air onto the vehicle. The various section components of each unit are similar and may be of any cross-sectional configuration such as cylindrical, oval or the like as will be described.

Figures 3, 4:
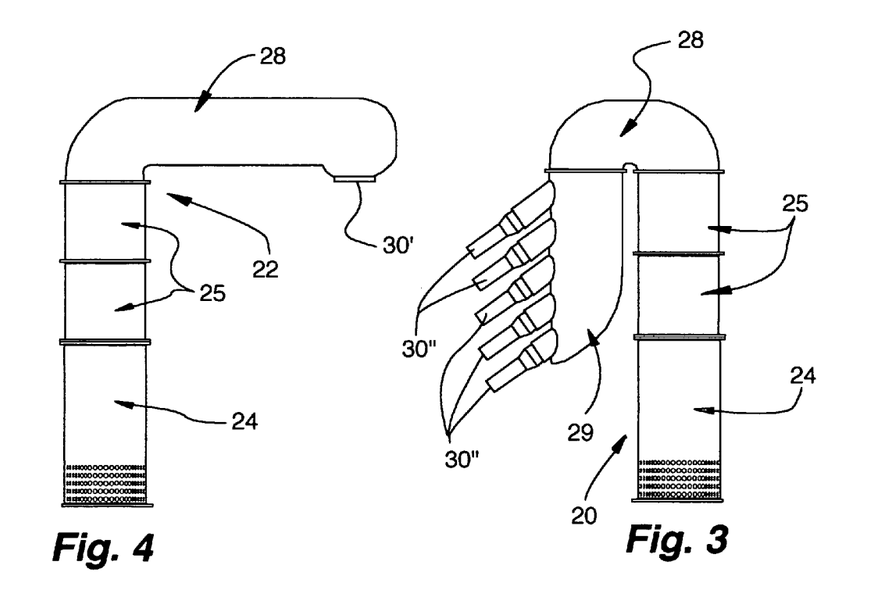
FIG. 3 is an elevation view of a vehicle side drying unit shown in FIG. 1.
FIG. 4 is an elevation view of a vehicle top drying unit shown in FIG. 1.

As generally shown in FIGS. 3 and 4, one top blower unit 22 with a single outlet nozzle 30' is used for drying the top of a vehicle, although a second top unit 23 and nozzle may be used as shown in FIG. 2. The pair of side units each with a plurality of outlet nozzles 30" inclined downwardly towards a side of the vehicle are utilized for drying the sides, front and rear surfaces of the vehicle.

Figure 5:
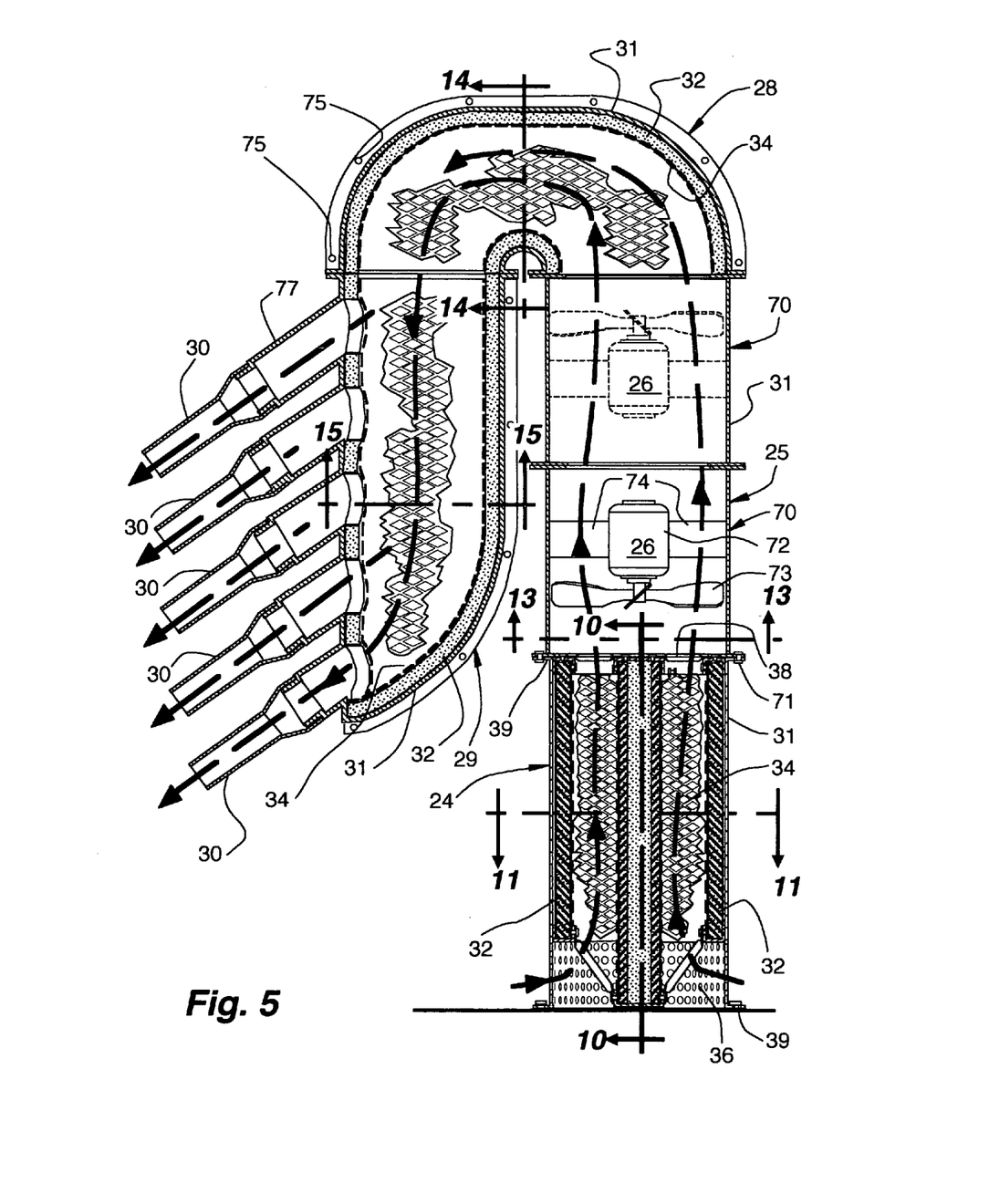
FIG. 5 is a section view taken substantially in the plane of line 5—5 on FIG. 2.
Figure 6:
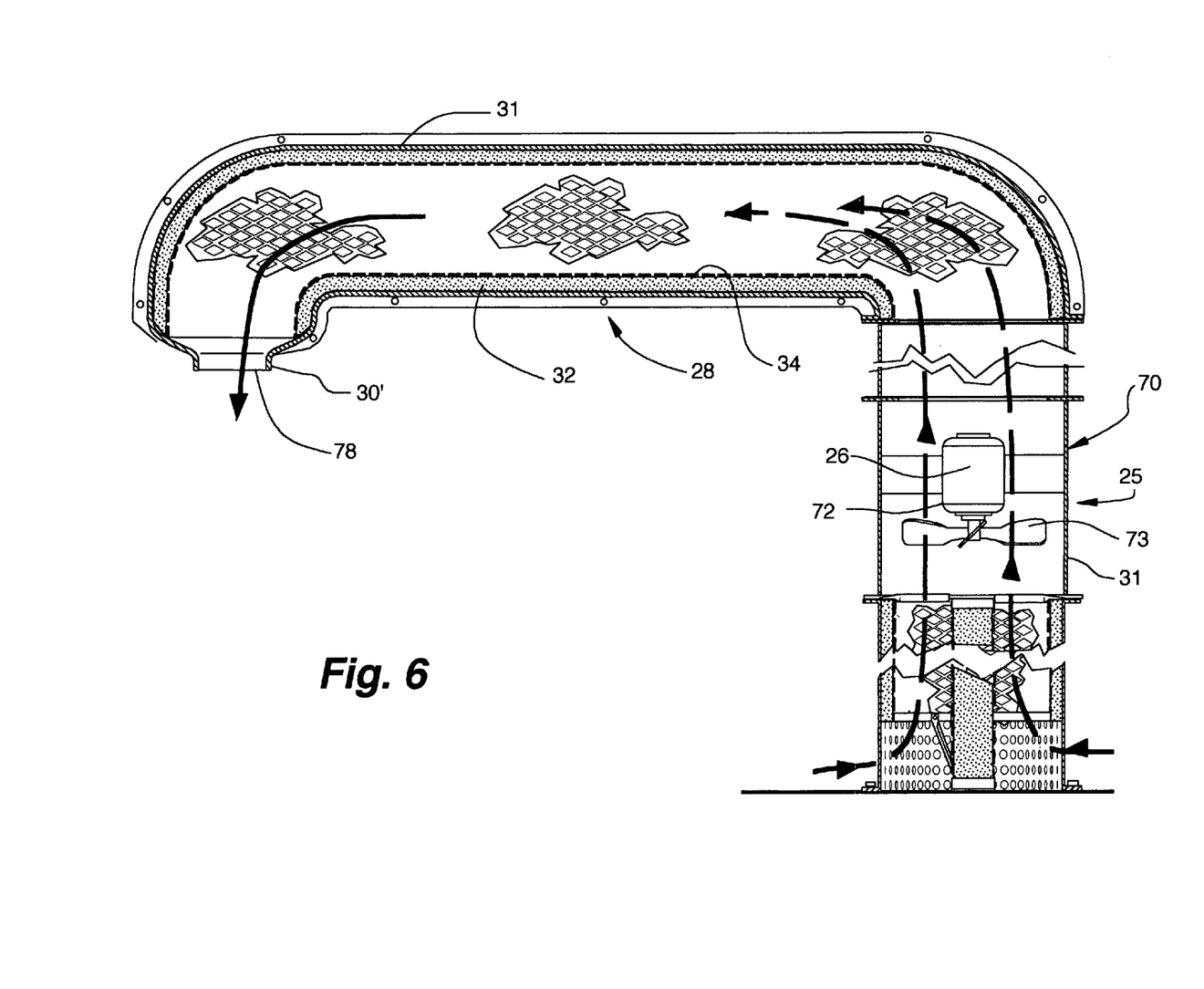
FIG. 6 is a section view taken substantially in the plane of line 66 on FIG. 2.

As shown in FIG. 5, each section of a unit, with the exception of the blower section 25, is formed by an outer, rigid shell or duct 31 constructed of a rigid material such as metal, either stainless steel or aluminum, or plastic, for example a moldable thermosetting plastic with glass fiber reinforcement, with an inner lining 32 of a porous material such as open cell polyurethane foam or rock wool, held in place by a stiffly flexible, relatively rigid, expanded mesh 34, formed of metal, such as stainless steel, galvanized steel, painted steel, or aluminum, or an expanded plastic mesh. When rock wool is utilized, an additional cloth mesh (not shown) may be utilized between the rock wool and the rigid mesh to further support the lining.

Figure 10:
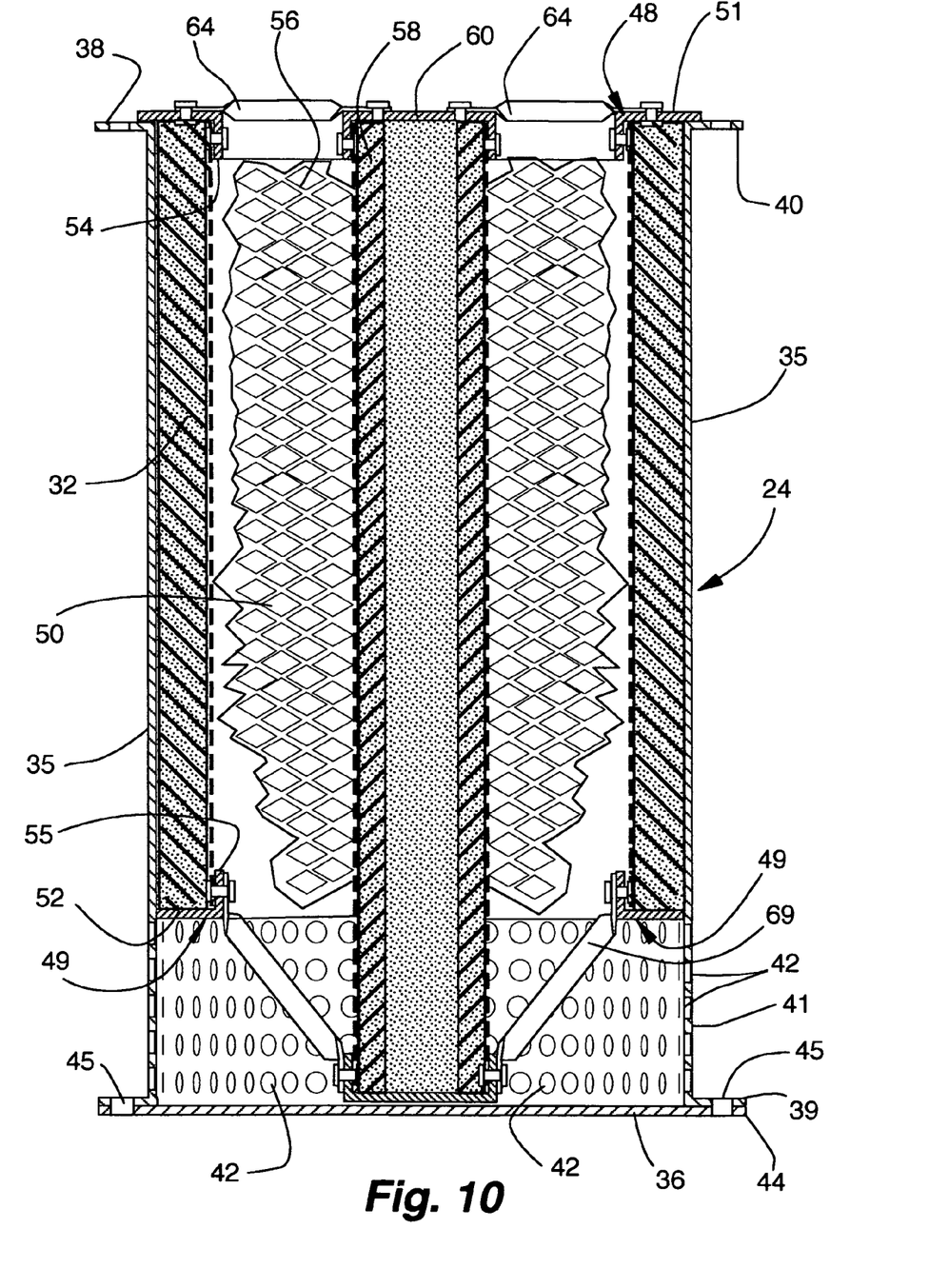
FIG. 10 is a section view taken substantially in the plane of line 10—10 on FIG. 5.
Figure 11:
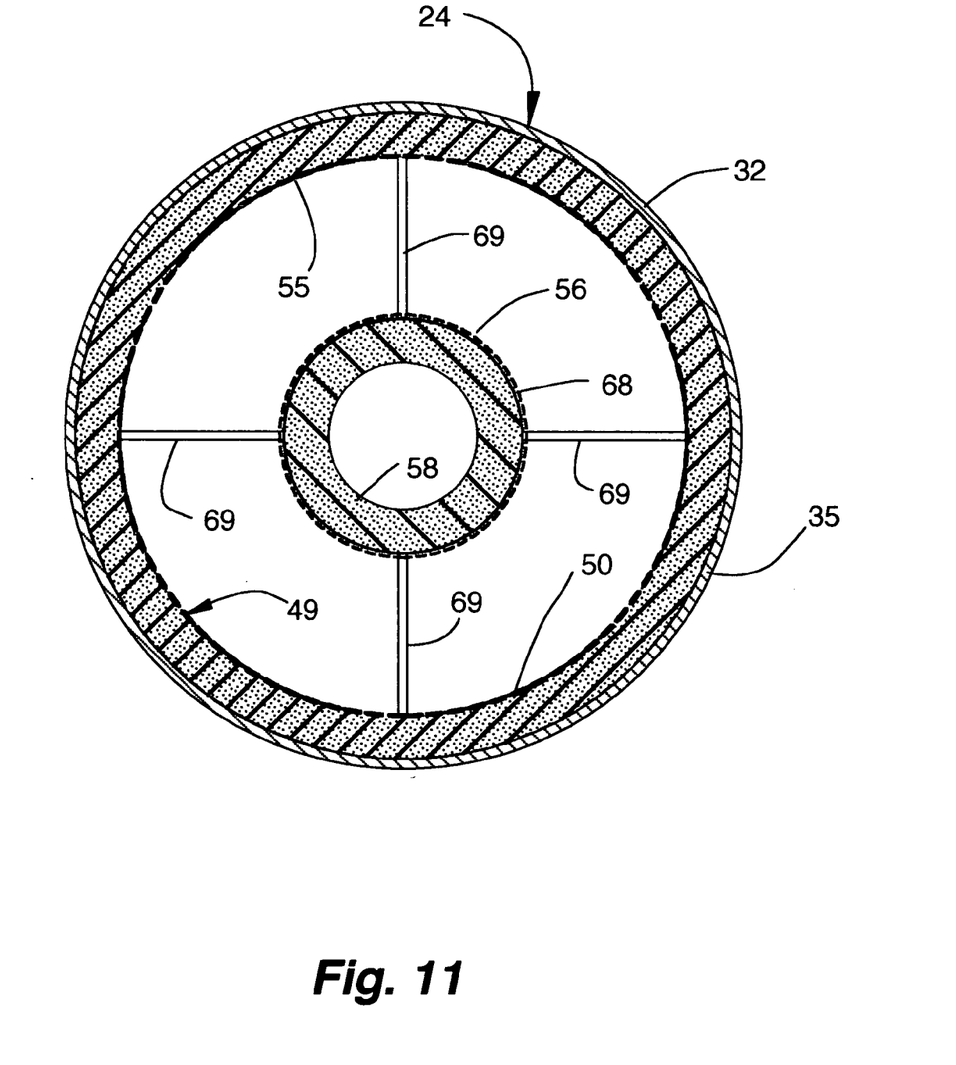
FIG. 11 is a section view taken substantially in the plane of line 11—11 on FIG. 5.

Turning first to the air intake section 24 of each unit, one embodiment of the air intake section 24 shown in FIG. 5 and FIGS. 7–12 of the drawings, is formed by an outer cylindrical shell or duct 35 having an inlet end 36 and an outlet end 38 with flanges 39, 40 respectively at each end. Air is drawn into this duct 35 through the lower portion 41 thereof adjacent the inlet end 36. This lower portion 41 is perforated or foraminous to provide a plurality of air inlet holes or apertures 42. If desired, such as to prevent water from entering the inlet end 36 of the intake section 24, a circular plate 44 as shown in FIG. 10 may be used to cover the bottom or inlet end 36 of the cylindrical duct or shell 35 below the perforations or openings 42. The outer duct 35 is secured to a floor or base with bolts or screws (not shown) extending through apertures 45 in the bottom flange 39.

A noise attenuating lining assembly 46 (FIG. 8) incorporating the foam layer 32 is removably housed within the outer cylindrical duct 35 and is formed by the outer layer 32 of open cell polyurethane foam or rock wool supported and retained in and extending between an upper annular flange 48 and a lower annular flange 49 secured at opposite ends of an open, metal or plastic mesh, cylindrical sleeve 50. The flanges 48, 49 are L-shaped in cross-section, defining radial flange rims 51, 52 respectively, and axial sleeves or lips 54, 55 respectively.

Figures 7, 8:
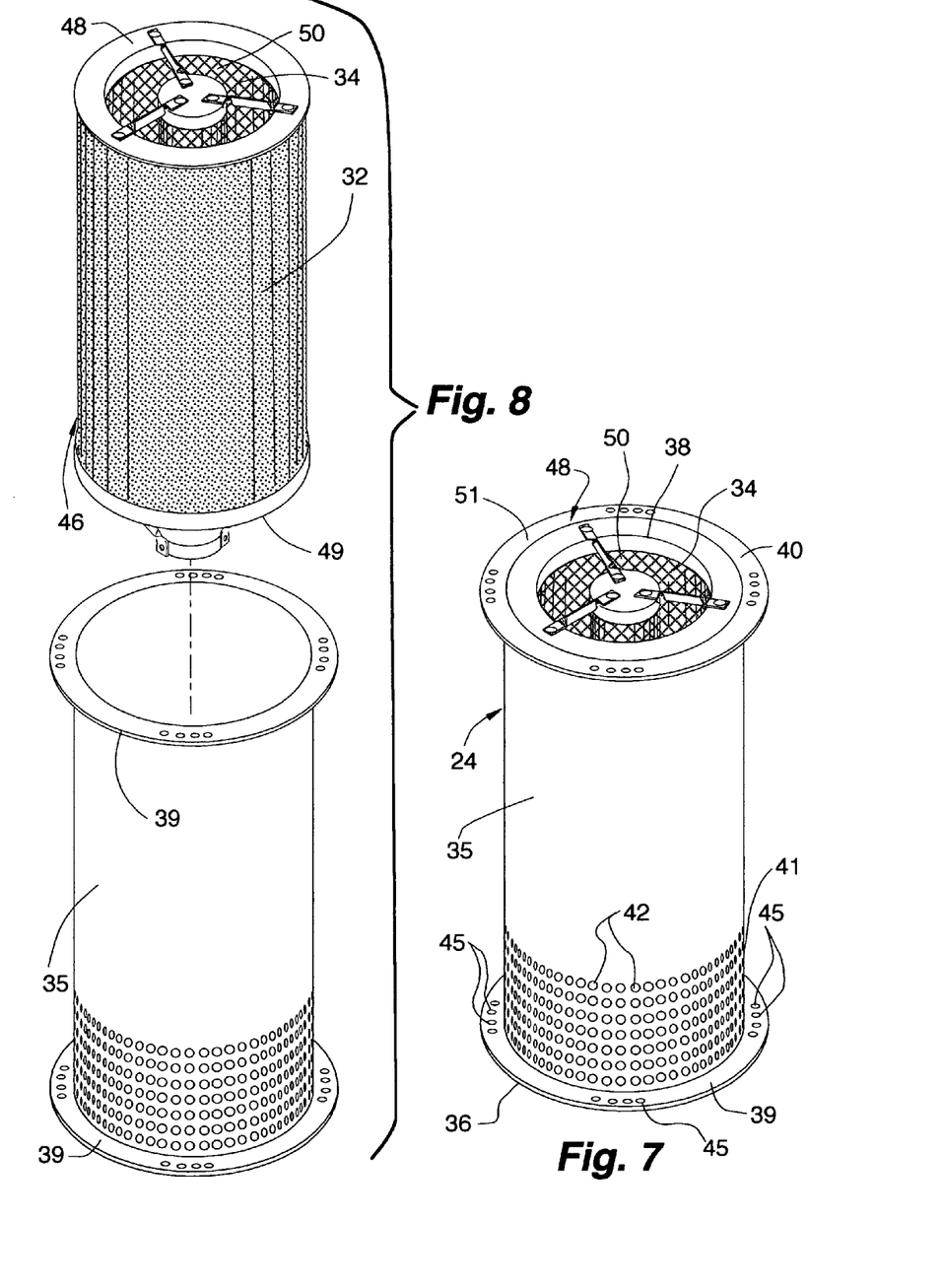
FIG. 7 is a front perspective view of an air intake unit embodying the present invention.
FIG. 8 is a partially exploded view of the air intake unit shown in FIG. 7.
Figure 9:
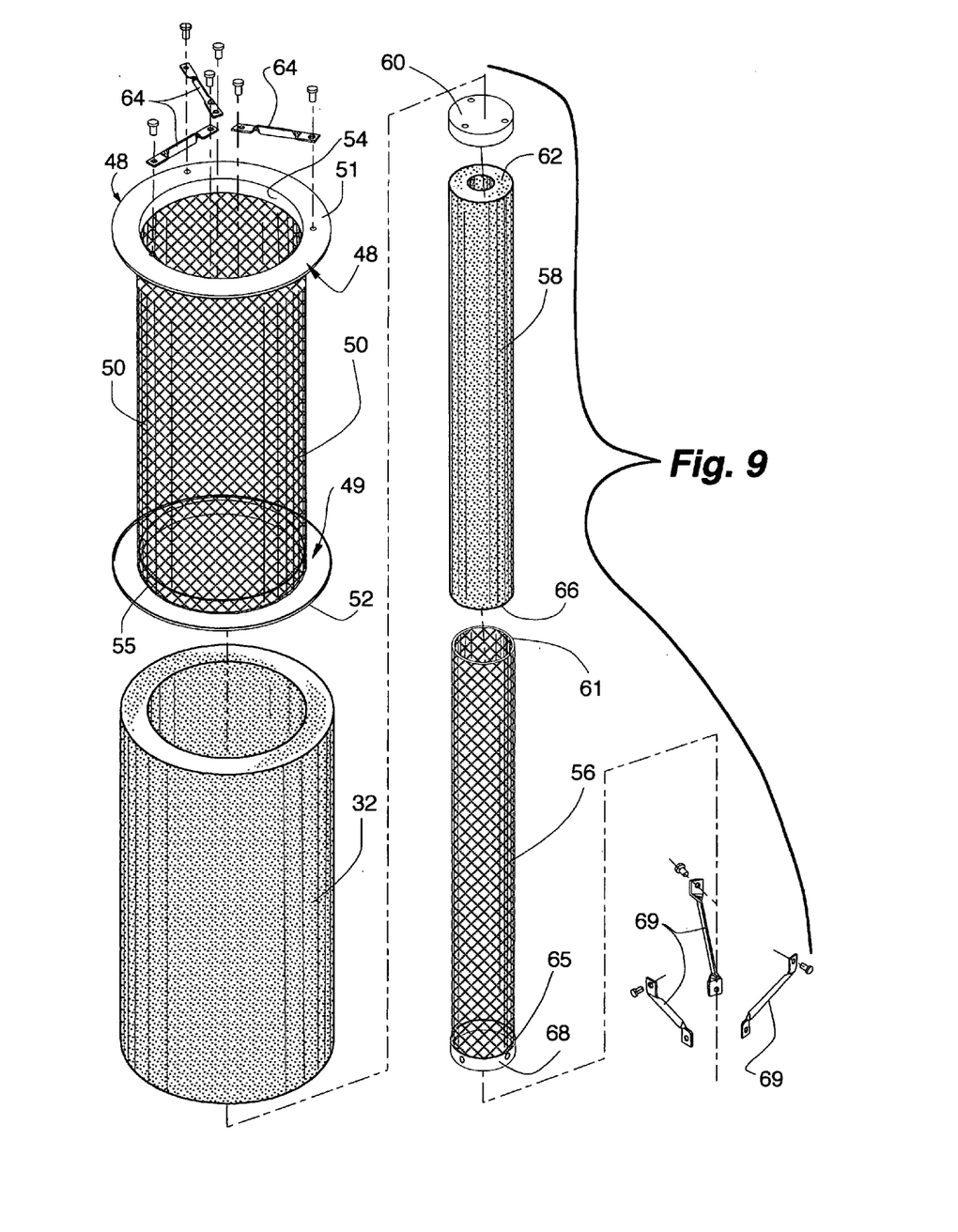
FIG. 9 is an exploded view of the air intake unit shown in FIG. 7.

The lining assembly 46 is supported within the duct 35 by the rim 51 of the upper flange 48, which rim 51 is of a diameter sufficient to overlap a portion of the outlet flange 40 of the duct 35. When the blower section 25 is mounted in place on the intake section 24, the rim 51 of the lining insert assembly 46 is sandwiched therebetween and held tightly in place. The lower annular flange 49 fits within the outer duct 35 and supports the mesh sleeve 50 and foam layer 46 therein with the foam layer 32 and outer edge of the lower flange rim 52 lying against the inner wall of the duct 35.

For further reducing air flow noise in the air intake section, a second, smaller diameter and mesh screen cylinder 56 (which may be fixed or removable) is positioned coaxially within the outer mesh screen cylinder 50 and outer cylindrical duct 35. Retained within the smaller diameter mesh screen cylinder 56 is a layer 58 of open cell polyurethane foam or rock wool. An inner mesh screen cylinder (not shown) may be used against the interior surface of the foam or rock wool layer 58 for support.

The smaller diameter mesh screen cylinder 56 and retained foam lining layer 58 is supported coaxially within the outer housing duct 35. To this end, a cap 60 covers the upper ends 61, 62 respectively of the inner cylindrical mesh sleeve 56 and lining 58. Radially projecting support arms or brackets 64 extend between the inner cap 60 and the upper flange 48 on the outer mesh sleeve 50 of the inserted lining assembly 46.

The inner mesh cylinder 56 and lining 58 may also be supported at their lower ends 65, 66 respectively. To this end, a lower end cap 68 covers the lower ends 65, 66, and support brackets 69 are secured to and extend between the lower cap 68 and the lip 55 on the lower end flange 49. The lower end of the smaller, inner mesh cylinder 56 and lining 58 may extend into the foraminous portion of the outer duct 35, as shown, or may terminate in line with the bottom end of the lining insert assembly 46.

Figure 12:
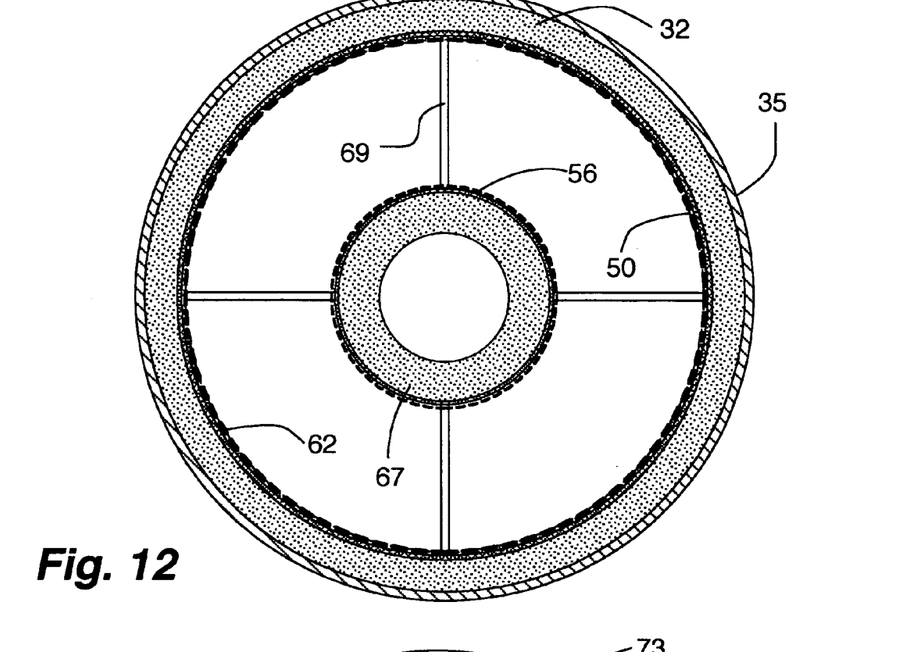
FIG. 12 is a section view similar to FIG. 11 but showing a cloth mesh supporting a rock wool liner.
Figure 13:
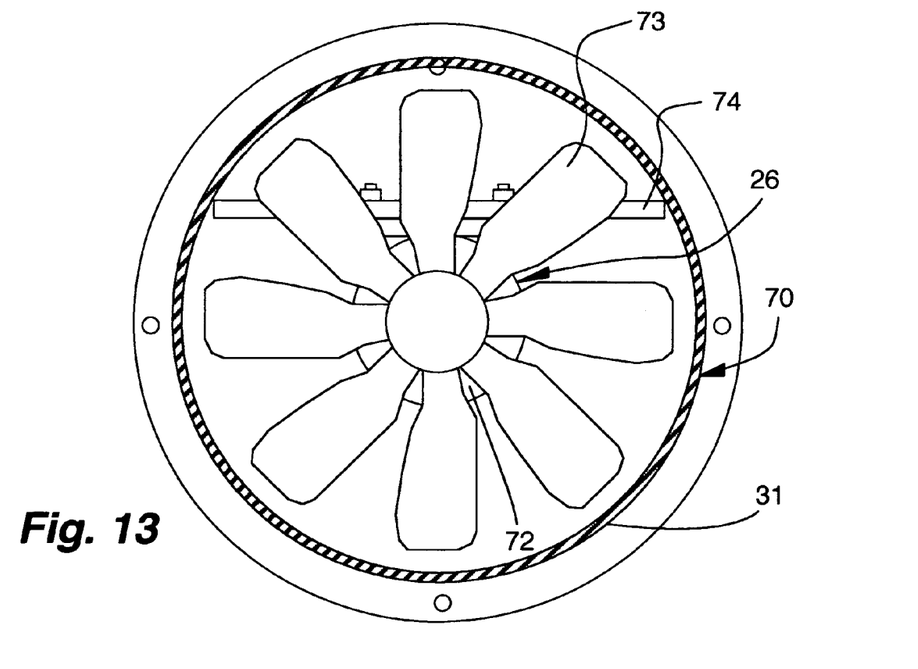
FIG. 13 is a section view taken substantially in the plane of line 13—13 on FIG. 5.

When rock wool is used as the lining material, an additional cloth mesh 67 is utilized under the rigid mesh 50, 56 to support the rock wool lining as shown in FIG. 12.

The blower section 25 is constructed of one or more blower units 70 each composed of an unlined flanged shell or duct 31 of metal or rigid plastic and a fan 26 as shown in FIG. 5. The blower units 70 are coaxially aligned with and mounted directly on the air intake section 24. The blower units and adjoining units are secured together by bolts or the like 71 extending through abutting flanges. The fans 26, including drive motors 72 and fan blades 73, are mounted within the fan ducts 31 by appropriate brackets 74. Controls (not shown) are provided for operating the fans. When two fans 26 are utilized, the fans are preferably mounted in a push-pull relation as shown in FIG. 5.

Figure 14:
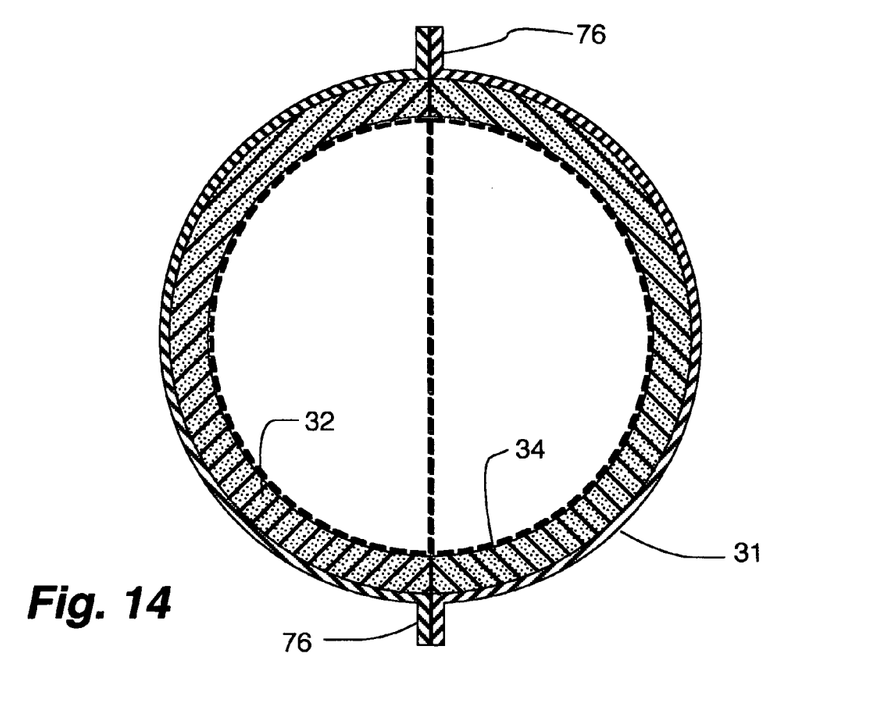
FIG. 14 is a section view taken substantially in the plane of line 14—14 on FIG. 5.
Figure 15:
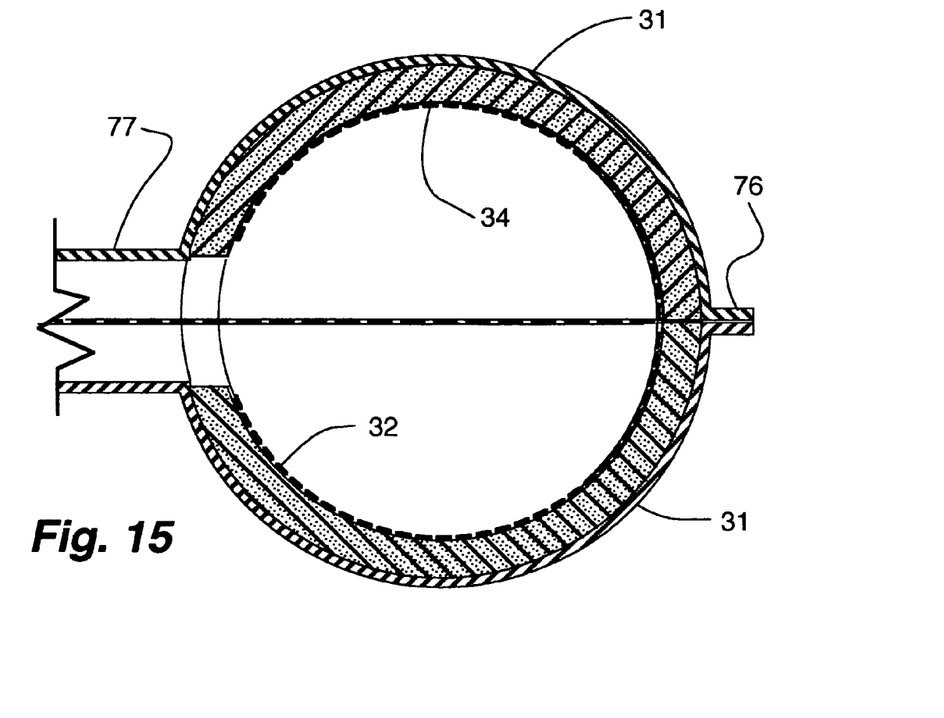
FIG. 15 is a section view taken substantially in the plane of line 15—15 on FIG. 5.

The transition section 28 and nozzle section 29 of each blower unit are formed by a molded outer shell or duct 31 of the desired configuration. The ducts preferably are formed by molding each shell in two parts with outwardly projecting edge flanges 76 and then securing the two parts together by appropriate fasteners 75 through the abutting flanges as shown in FIGS. 5, 14 and 15.

Figure 16:
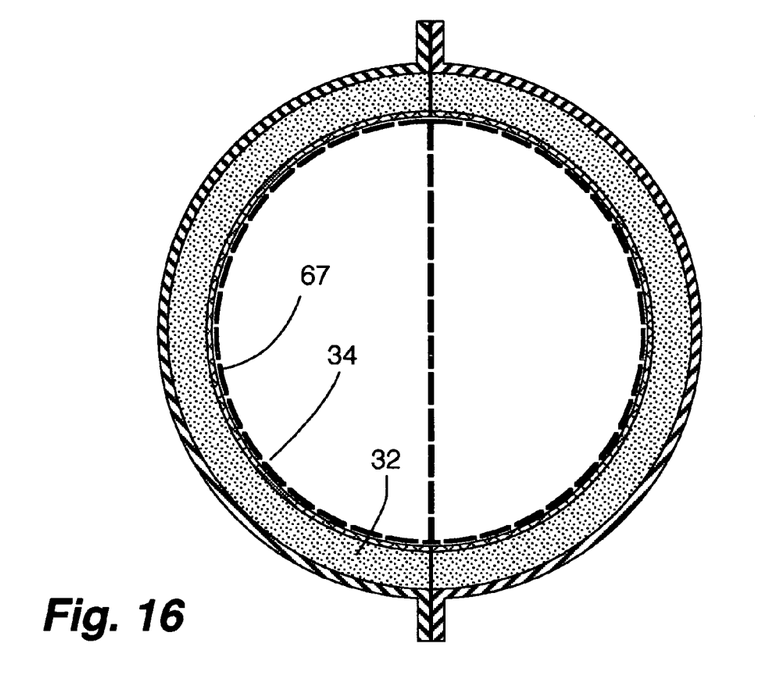
FIG. 16 is a section view similar to FIG. 14 but showing a cloth mesh supporting a rock wool liner.
Figure 17:
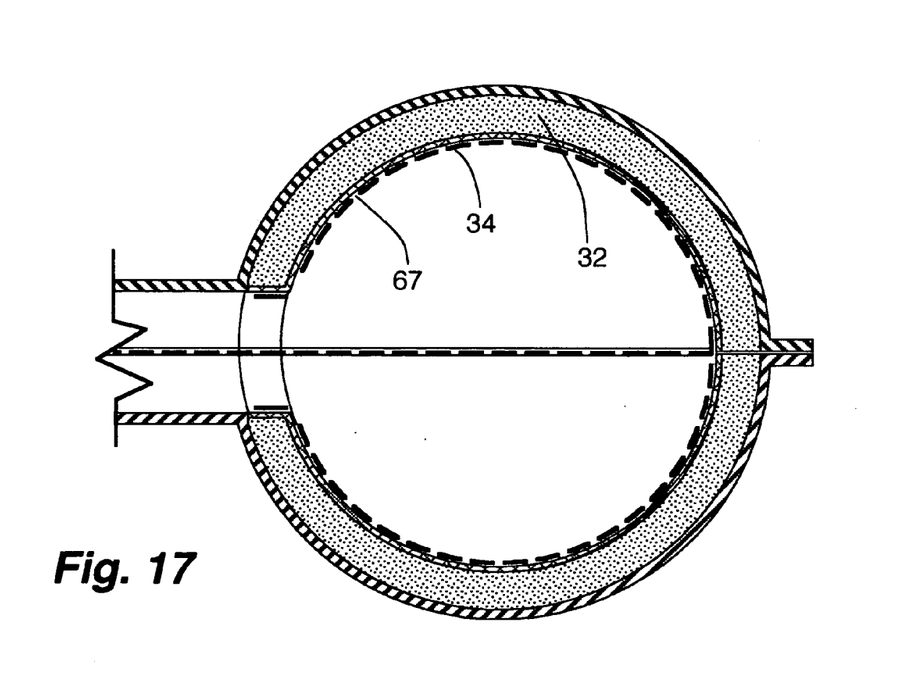
FIG. 17 is a section view similar to FIG. 15 but showing a cloth mesh supporting a rock wool liner.
Figure 18:
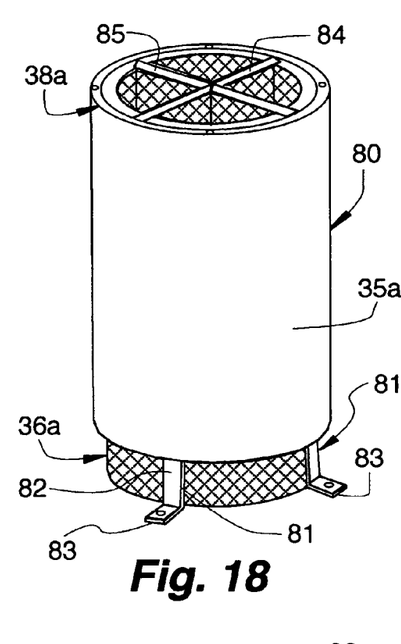
FIG. 18 is a front perspective view of an air intake unit embodying a modified form of the present invention.
Figure 19:
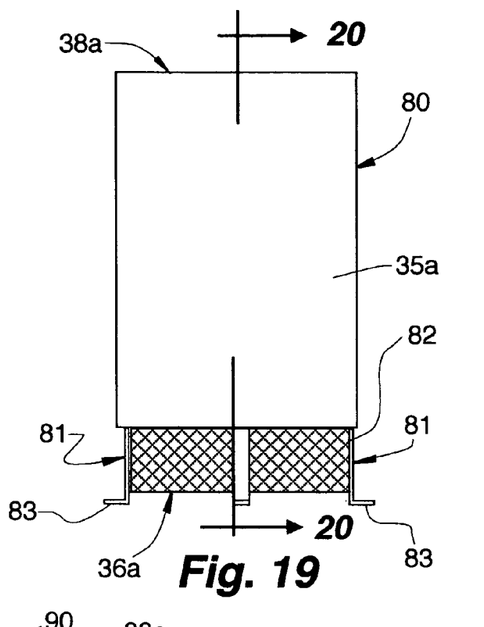
FIG. 19 is a front elevation view of the air intake unit shown in FIG. 19.
Figure 20:
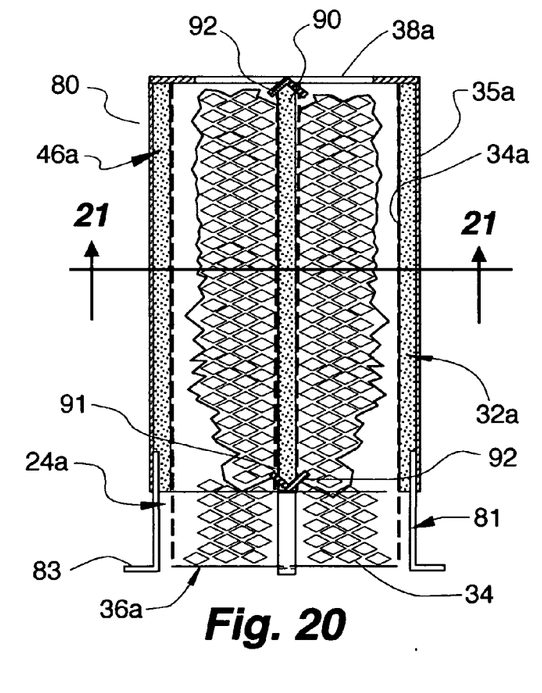
FIG. 20 is a section view taken substantially in the plane of line 20—20 on FIG. 19.

The molded ducts are lined on their interior surfaces with a noise attenuating lining 32 of open cell polyurethane foam as shown in FIGS. 5, 6, 14 and 15. The lining is supported by rigid open mesh expanded metal or plastic 34. Rock wool could also be used as an alternative lining. However, if used, an additional cloth mesh 67 would be positioned between the lining and the rigid mesh to support the lining as shown in FIGS. 16 and 17.

In the side units 20, 21, outlet tubes 77 are formed directly in the molded shell parts. Flexible molded nozzles 30 are attached to the duct tubes 77 of the outlet section 29. A single nozzle opening 78 is molded at the outlet end of the transition duct for the overhead top unit blower 22.

A modified form of an air intake section is shown in FIGS. 18–21. In describing this modification, elements similar to those shown in FIGS. 1–17 will be identified by similar reference numerals with the distinguishing suffix "a."

The modified air intake section 80 shown in FIGS. 18–21 is formed by an outer cylindrical intake duct 35a having an inlet end 36a and an outlet end 38a, with flanges 39a, 40a respectively at each end. In order for air to be drawn into the intake duct 35a, the inlet end 36a thereof is raised above the floor or pad on which the blower unit is mounted by L-shaped legs 81 depending from the inlet end 36a of the intake duct 35a and having a longitudinal leg 82 secured to the inner surface of the duct 35a by rivets or welding, or the like, (not shown) and an out-turned foot 83 for supporting the intake section duct 24a. The feet 83 are secured to a floor or base by bolts or screws (not shown) extending through apertures (not shown) therein.

A noise attenuating lining assembly 46a is housed within the outer cylindrical intake duct 35a and is formed by an outer layer 32a of open cell polyurethane foam or rock wool, supported and retained in the intake duct 35a by an open expanded mesh cylindrical sleeve 34a. The mesh sleeve 34a extends the combined length of the duct 35a and the length of the legs 82 extending below the duct. The lower portion of the mesh 34a adjacent the legs provides an open aperture mesh screen allowing for the flow of air into the intake section 35a.

Figure 21:
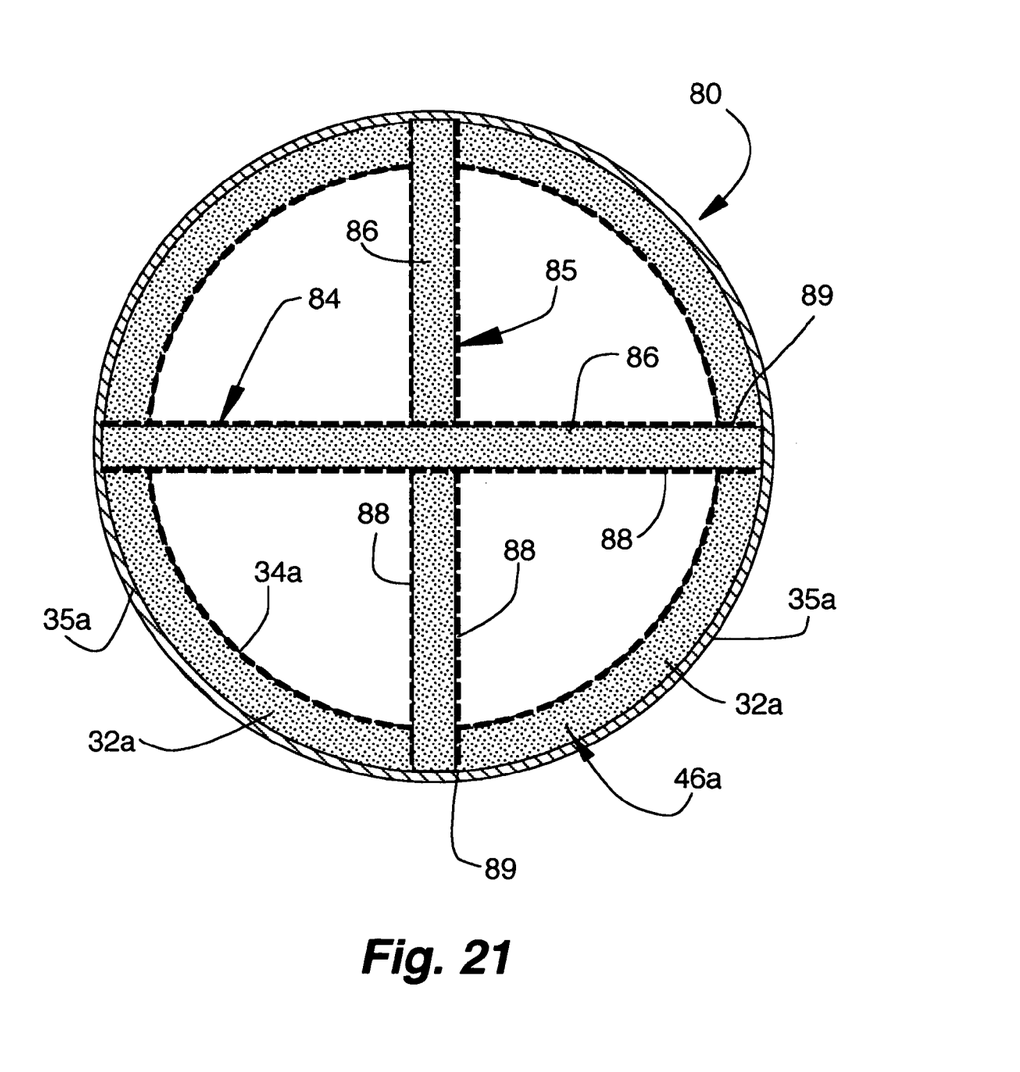
FIG. 21 is a section view taken substantially in the plane of line 21—21 on FIG. 20.

For enhancing the attenuation of noise in the duct 35a, a pair of mutually perpendicular, longitudinally extending diametric panels 84, 85 (which may be fixed or removable) are positioned within the duct and secured to the lining mesh 34a therein. Each panel, as best shown in FIG. 21, is formed by a foam or rock wool panel 86 supported on both surfaces between metal or plastic open mesh screens 88. The panel screens 88 are secured along their outer edges 89 to the interior mesh 34a lining the intake duct 35a. The panels preferably are coextensive with the length of the duct 35a. The upper and lower panel edges 90, 91 respectively are capped by cap strips 92, such as angle channel strips, secured to the panel mesh screens 88.

The molded ducts are formed of any appropriate plastic material having sufficient strength and usually reinforced by glass fiber. Following molding, the foam open cell polyurethane foam for example is laid in the shell. After the foam is in place it is covered with expanded metal or plastic mesh which is fastened in place by strips of fiberglass which are attached to the main shell or housing.

Air flowing through a conduit creates a noise generally because of the turbulence of the air in the layer of air flow adjacent the conduit walls. In the present invention, such noise is attenuated by the application of the layer of open cell foam or rock wool to the inner surface of the outer conduit shell and retaining the foam or rock wool in place by a rigid expanded mesh screen. When using rock wool and like materials, an additional expanded mesh cloth is utilized between the rock wool and the inner expanded mesh sleeve to retain the rock wool in place. Such a lining is not generally utilized in the fan and motor blower compartments or sections. The function of the polyurethane foam or rock wool in these components is twofold. One, it reduces reverberation and noise transfer related to sound levels. Additionally, air is trapped in the open cell pores so that moving air passing over the surface has less friction because it is in contact with a like kind of surface thereby reducing turbulence and providing for faster, less turbulent, and less noisy air flow.

While certain illustrative embodiments of the present invention have been shown in the drawings and described above in detail, it should be understood that there is no intention to limit the invention to the specific forms and embodiments disclosed. On the contrary, the intention is to cover all modifications, alternative constructions, equivalents and uses falling within the spirit and scope of the invention as expressed in the appended claims.

The invention claimed is:

1. An air intake duct for a motor vehicle air drying apparatus comprising:
    an outer cylindrical duct defining an inner surface; and
    a removable cylindrical sleeve including:
        a porous layer adjacent said duct inner surface and defining an inner surface;
        an outer rigid expanded mesh lining said inner surface of said porous layer and retaining said porous layer; and
        an inner cylinder mounted within said sleeve and extending coaxially therein and having an outer surface spaced radially inwardly from said outer expanded metal mesh; said cylinder comprising a porous layer defining an outer surface and an outer expanded metal mesh surrounding and supporting said cylinder porous layer and defining said outer surface of said inner cylinder.

2. An air duct as defined in claim 1 wherein said outer duct is fabricated from a material selected from the group consisting of stainless steel, aluminum, rigid plastic and glass fiber plastic.

3. An air duct as defined in claim 1 wherein said porous layer is open cell polyurethane foam.

4. An air duct as defined in claim 1 wherein said porous layer is rock wool.

5. An air duct as defined in claim 4 wherein said rock wool layer is retained by expanded glass fiber cloth mesh.

6. An air duct as defined in claim 1 wherein said mesh is selected from the group consisting of stainless steel mesh, galvanized steel mesh, painted steel mesh, aluminum mesh, and plastic mesh.

7. An air intake duct as defined in claim 1 further comprising a plurality of radially extending brackets extending between said inner cylinder and said outer expanded mesh and supporting said inner cylinder in said sleeve duct.

8. An air intake duct as defined in claim 1 wherein said outer cylindrical duct defines a foraminous section adjacent its inlet end.

9. An air intake duct as defined in claim 8 further comprising a plate closing said inlet end below said foraminous section.

10. An air intake duct for a motor vehicle air dryer, comprising:
    an outer cylindrical duct having an air inlet end and an air outlet end and defining an inner surface and a cylindrical longitudinally extending air passage having a center axis;
    an intermediate sleeve removably positioned within said outer duct adjacent the inner surface thereof and comprising an inner rigid, expanded mesh cylindrical sleeve and an outer porous sleeve contained and supported on its inner surface by said mesh sleeve and having its outer surface engaging the inner surface of said outer cylindrical duct, said inner mesh sleeve having an inlet end and an outlet end corresponding to the inlet and outlet ends respectively of said outer duct;
    annular end channels mounted at the inlet and outlet ends of said mesh sleeve for supporting said porous sleeve and having an outer radial dimension corresponding to the internal diameter of said outer duct for supporting said intermediate sleeve therein;
    an inner longitudinally extending sleeve positioned coaxially in said intermediate sleeve, said inner sleeve having inner and outer spaced apart wire mesh sleeves defining an annular chamber;
    an annular porous sleeve retained in said annular chamber;
    end caps covering the ends of said inner sleeve; and
    brackets extending between said end caps and said annular end channels supporting said inner sleeve on said intermediate sleeve;
    said outer duct defining a plurality of perforations adjacent the inner end thereof forming intake air passages.

11. An air intake duct as defined in claim 10, further comprising a plate affixed to the outer duct below the intake air passages for closing the inlet end of said outer duct to prevent introduction of water thereinto.

12. A method of attenuating the noise of air flow in the intake section of an air dryer for motor vehicles, comprising:
    inserting into said intake section a removable cylindrical sleeve including an outer-layer of porous material and an inner layer of porous material spaced radially inwardly of said outer layer supporting said layers of porous material with rigid, stiffly flexible, expanded mesh layers; and supporting said layers of porous material and rigid expanded mesh layers wit radial panels of porous material extending therebetween.

13. A method of attenuating the noise of air flow in the intake section of an air dryer for motor vehicles, comprising: inserting into said intake section of an air dryer for motor vehicles a removable cylindrical sleeve including an outer layer of porous material and an inner layer of porous material spaced radially inwardly of said outer layer; supporting said layers of porous material with rigid, stiffly flexible, expanded mesh layers;

removing the removable cylindrical sleeve from the intake section, and     inserting another removable cylindrical sleeve into said intake section.

\* \* \* \* \*